United States Patent Office 3,484,355
Patented Dec. 16, 1969

3,484,355
PRODUCTION OF DITHIOLS
Paul F. Warner, Phillips, Tex., assignor to Phillips
Petroleum Company, a corporation of Delaware
No Drawing. Filed Nov. 10, 1966, Ser. No. 593,330
Int. Cl. C07c 149/26; C08f 5/00, 17/00
U.S. Cl. 204—162                                    5 Claims

ABSTRACT OF THE DISCLOSURE

Thiol-terminated polymers are produced by the reaction of ethylcyclohexyl dimercaptan with vinylcyclohexene under the influence of ultraviolet light in excess of 3,000 angstrom unit wave lengths and in the absence of additional promoters.

---

This invention relates to a method for producing dithiols, and the dithiols so produced. In one aspect, it relates to the reaction of a diolefin and a dimercaptan in the presence of ultra-violet light having a wave length of at least 3,000 angstrom units to produce dithiols. In another aspect, it relates to the reaction of ethylcyclohexyl dimercaptan and vinylcyclohexene initiated by actinic radiation having a wave length of at least 3,000 angstroms, but without the use of any additional promoters. In another aspect, it relates to the sunlight-promoted reaction of vinylcyclohexene and ethylcyclohexyl dimercaptan. In another aspect, it relates to a method of controlling the molecular weight of a polymer produced by the radiation-induced reaction of ethylcyclohexyl dimercaptan and vinylcyclohexene.

The reaction of various mercaptan compounds with olefins to produce sulfides at high temperatures is known. It is also known to react mercaptans and olefins in the presence of ultra-violet radiation having a wave length less than 3,000 angstrom units without the use of catalysts or promoters. Such reaction, however, requires the use of quartz equipment inasmuch as glass and Pyrex absorb radiations having wave lengths less than 3,000 angstrom units. The reaction of these materials with ultra-violet light above 3,000 angstrom units wave length has also been recorded, but requires the use of metallohydrocarbon compounds, such as tetraethyl lead, as reaction promoters. These reaction conditions have been used both for reacting mono-olefins with monomercaptans, and also for reacting diolefins with dimercaptans to attain a chain-building reaction resulting in a thiol-terminated sulfide polymer. Prior to my invention, however, it has not been known that any particular diolefin compounds could be reacted with any particular dimercaptan compounds using ultra-violet light having a wave length greater than 3,000 angstrom units without additional reaction promoting compounds.

It is, therefore, an object of my invention to react a diolefin with a dimercaptan in ultra-violet light above 3,000 angstrom unit wave length without promoters. It is another object of my invention to produce a thiol terminated polymer by the reaction of a diolefin and a dimercaptan in the presence of ultra-violet light above 3,000 angstrom units without the use of a promoter. It is another object of my invention to produce a dithiol by reacting a dimercaptan with a diolefin in the presence of sunlight. It is a still further object of my invention to react ethylcyclohexyl dimercaptan and vinylcyclohexene in the presence of ultra-violet light having a wave length of at least 3,000 angstrom units without a promoter. It is yet another object of my invention to provide a polymeric thiol by the sunlight-induced reaction of ethylcyclohexyl dimercaptan and vinylcyclohexene.

Other aspects, objects and the several advantages of this invention will be apparent to one skilled in the art from a study of this disclosure and the appended claims.

According to the invention, ethylcyclohexyl dimercaptan and vinylcyclohexene are reacted in the presence of sunlight or ultra-violet light without promoters to form a thiol terminated polymer.

The term "ethylcyclohexyl dimercaptan" as used herein refers to a mixture of β-mercaptoethyl-3-mercaptocyclohexane and β-mercaptoethyl-4-mercaptocyclohexane, and is formed by the reaction of vinylcyclohexene with hydrogen sulfide, as is known in the art. The product so formed will contain, in addition to the ethylcyclohexyl dimercaptan, polymeric thiols comprising about 25 to 45 weight percent of the product. This crude product may be used as such in the practice of my invention, or it may be purified by distillation to remove the heavy materials.

The vinylcyclohexene used in the process of my invention can be obtained from various sources, and can be the pure material or the technical grade, an article of commerce, or other suitable mixture.

Reaction between the ethylcyclohexyl dimercaptan and the vinylcyclohexene will take place when the mixture is exposed to sunlight, or to ultra-violet radiation. According to my invention, no promoters need be added to the reaction mixture. Reaction time will, of course, depend upon the intensity of the radiations received by the reaction mixture. Depending upon reaction conditions, an ultra-violet-induced reaction will be substantially completed in a period of time between ½ to 72 hours or more, and preferably from about 1 to about 10 hours, depending upon the conditions of reaction. The reaction temperature can vary over a wide range and generally will range from about −50° to about 300° F. The pressure at which the reaction is carried out will also vary and generally will be sufficient to maintain liquid phase conditions although vapor phase or mixed phase conditions are contemplated. The pressure can, accordingly, vary from about atmospheric to about 1000 pounds per square inch, although these limits are in no way critical. If the reaction is sunlight-induced, the reaction will go to substantial completion between ¼ day and 3 weeks, depending upon sunlight intensity. Generally, a period of ½ day to 1 week will be required.

The dithiol is generally present in excess on a molar basis as compared to the diolefin. Generally, the ratios of reactants will be so chosen so that the ratio will contain one more mol of dithiol than of diolefin, e.g., 2/1, 3/2, 4/3, 5/4, etc.

It has also been found that the molecular weight of the thiol produced can be controlled by the ratio of the dithiol to the diolefin. It has been found that the greater the excess of the dithiol in the reaction mixture, the lower the molecular weight of the product will be. Thus, a reaction mixture having the ratio of 2 parts dithiol to one of diolefin will have a considerably lower molecular weight than a mixture having 4 parts dithiol to three parts diolefin.

Since the reaction is induced by ultra-violet light having a wave length of at least 3,000 angstroms, it is unnecessary to use specially constructed laboratory equipment. Reactors having normal glass or borosilicate glass windows for admission of the radiation are satisfactory.

The compounds produced by the process of this reaction, having free thiol groups, are suitable for use in calking compounds, and as curing agents for epoxy resins. They have also been successfully tested as ingredients in sulfur-based highway paint compositions.

EXAMPLE I

Purified ethylcyclohexyl dimercaptan and vinylcyclohexene were reacted in the presence of sunlight. The two components were mixed together in a molar ratio of 2.2 mols of the dimercaptan to 1 mol of vinylcyclohexene, and placed in the sunlight. Prior to exposure to the sunlight, the mercaptan sulfur of the reaction mixture analyzed 28.38 weight percent. Samples of the reaction mixtures were taken after 1, 4 and 15 days. The analysis for mercaptan sulfur is shown below.

| Days: | Mercaptan sulfur, wt. percent |
|---|---|
| 0 | 28.38 |
| 1 | 19.35 |
| 4 | 18.19 |
| 15 | 18.04 |

After 15 days of sunlight irradiation, the reaction mixture was placed in a rotary evaporator at 300° F. and 0.5 mm. mercury for 30 minutes. The non-volatile product recovered had a molecular weight of 373, a mercaptan sulfur content of 14.6 percent, a viscosity of 10 poise at 77° F., and a thiol content of 1.74 units per mol.

EXAMPLE II

Purified ethylcyclohexyl dimercaptan and vinylcyclohexene were mixed together in a ratio of 4 mols of the dimercaptan to 3 mols of the diolefin. The mixture was irradiated in sunlight for 18 days, and further exposed to ultra-violet irradiation for 5½ hours. Mercaptan sulfur analysis was:

| Days: | Mercaptan sulfur, wt. percent |
|---|---|
| 0 | 24.68 |
| 1 | 12.02 |
| 3 | 10.83 |
| 18 | 9.52 |

At the end of 18 days, a sample was further exposed to 5.5 hours of ultra-violet radiation, which resulted in a further decrease of the mercaptan sulfur to a content of 8.62 percent. This product was evaporated by heating at 300° F. at 0.5 mm. mercury for 30 minutes. The non-volatile product had a molecular weight of 642, a total sulfur content of 23.2 percent, a mercaptan sulfur content of 6.94 percent, a viscosity of 138 poise at 77° F., and contained 1.39 thiol units per mol.

EXAMPLE III

Unpurified ethylcyclohexyl dimercaptan containing the heavy products of the formation reaction was mixed with vinylcyclohexene in the presence of sunlight. The dimercaptan starting material had a molecular weight of 218.6, a heavies content of 39.5 percent, and a mercaptan sulfur content of 28.52 percent. This product was mixed with vinylcyclohexene in a ratio of 4 mols of the dimercaptan with 3 mols of the diolefin. Mercaptan sulfur analysis was:

| Days: | Mercaptan sulfur, wt. percent |
|---|---|
| 0 | 20.82 |
| 6 | 8.18 |
| 11 | 6.34 |

At the end of 11 days, the product was recovered as described in the examples above. The recovered product had a molecular weight of 770, a total sulfur content of 22.4 percent, a mercaptan sulfur content of 5.35 percent, a viscosity of 618 poise at 77° F., and a thiol content of 1.29 units per mol.

Examples I and II above demonstrate the variation in properties which can be obtained by varying the mol ratio of the reactants. Example III further shows the use of an unpurified starting material yielding a higher molecular weight product. The analysis for thiol units per mol indicates that the product obtained by the process of my invention is predominantly a mixture of mono- and dithiols.

Reasonable variation and modification are permissible within the scope of this disclosure and the appended claims to my invention, the essence of which is that vinylcyclohexene and ethylcyclohexyl dimercaptan are reacted under the influence of sunlight or ultra-violet light having a wave length of at least 3,000 angstrom units in the absence of any additional promoters.

I claim:

1. Process for forming a thiol-containing polymeric compound comprising reacting vinylcyclohexene with a molar excess of ethylcyclohexyl dimercaptan, the ratios of reactants being chosen so that the ratio will contain one more mole of dimercaptan than of vinylcyclohexene, under the influence of ultra-violet light having a wave length of at least 3,000 angstrom units and in the absence of additional promoters.

2. Process of claim 1 wherein said ultra-violet light is derived from sunlight.

3. Process of claim 1 wherein said ethylcyclohexyl dimercaptan is the unpurified reaction product of hydrogen sulfide and vinylcyclohexene.

4. Process of claim 1 for producing a thiol-containing polymer of particular molecular weight comprising reacting ethylcyclohexyl dimercaptan with vinylcyclohexene under the influence of ultra-violet light having a wave length of at least 3,000 angstrom units and in the absence of promoters in a molar ratio selected to yield polymer of the desired molecular weight.

5. Process of claim 1 wherein a polymer of predetermined molecular weight is obtained by varying the molar ratio of the said dimercaptan to said vinylcyclohexene, an increase in said ratio resulting in a decrease in molecular weight, and a decrease in said ratio resulting in an increase in said molecular weight.

References Cited

UNITED STATES PATENTS 3,143,487    8/1964    Warner _____ 204—158

HOWARD S. WILLIAMS, Primary Examiner